June 6, 1944. S. F. CASAVANT 2,350,338
OPHTHALMIC MOUNTING
Filed Jan. 23, 1941
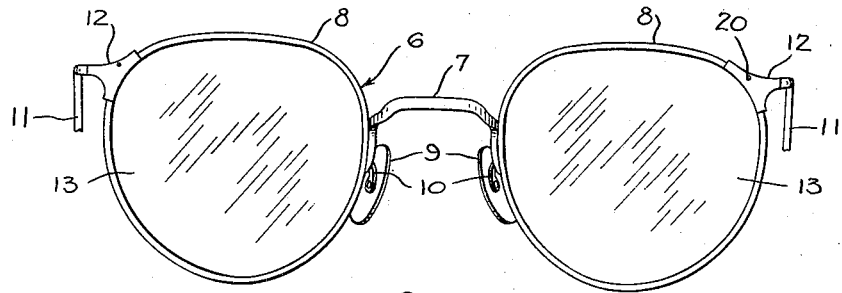
Fig. I
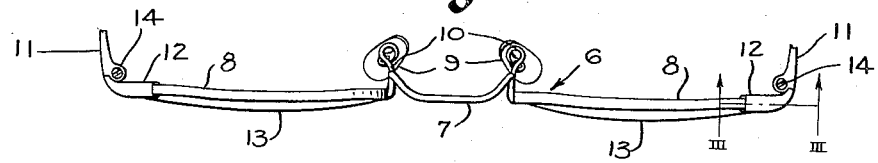
Fig. II
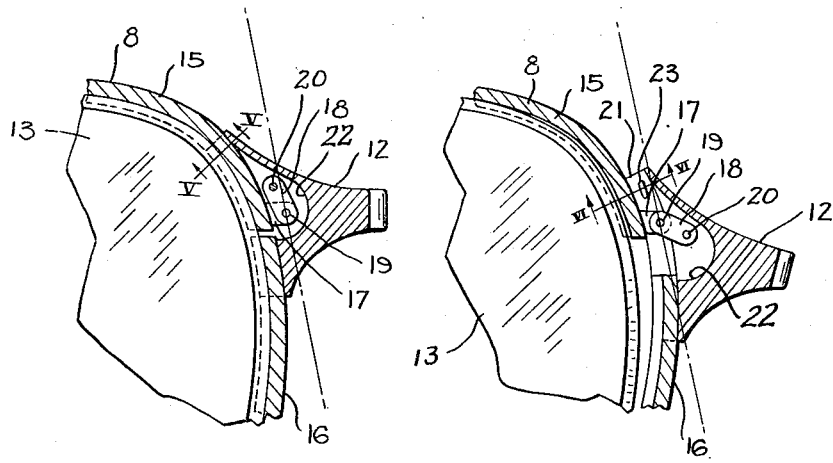
Fig. III   Fig. IV
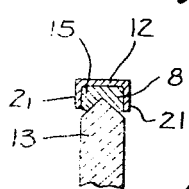
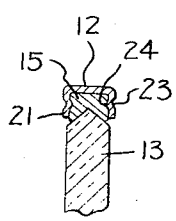
Fig. V   Fig. VI
INVENTOR.
STUART F. CASAVANT
BY Louis L. Wagner
ATTORNEY.

Patented June 6, 1944

2,350,338

UNITED STATES PATENT OFFIC'

2,350,338

OPHTHALMIC MOUNTING

Stuart F. Casavant, Southbridge, Mass., assignor to American Optical Company, Southbridge, Mass., a voluntary association of Massachusetts Application January 23, 1941, Serial No. 375,645

7 Claims. (Cl. 88—47)

This invention relates to improvements in ophthalmic mountings and has particular reference to an improved means for securing a lens in the lens-rim of an ophthalmic mounting.

A primary object of the invention is to provide an ophthalmic mounting employing a closed separable split lens-rim having a snap action for positively securing the lens in its normally assembled position.

A further object is to provide an ophthalmic mounting having a split lens-rim with a link connection between opposing sides of said split having a substantially dust-proof container enclosing the link means and the split in the lens-rim.

A further object of the invention is to provide improved lens holding means with which the lens may be more readily assembled in the lens-rim without removing any operable part of the ophthalmic mounting.

A further object is to provide an ophthalmic mounting of the split lens-rim type having a temple support in the form of a shell to encase the split lens-rim link means and engage both sides of the split securely, to restrict lateral motion of the temple support and provide a more rigid connecting means between the temple and the lens-rim.

Another object of the invention is to provide an ophthalmic mounting having the lens-rim securing means nearer to the periphery of said rim so that the force applied to the lens gripping means will be of substantially equal distribution about the periphery of the lens.

Another object is to provide a lens holding means having a temple support arranged in such a manner that lenses may be interchanged without disturbing the temple connection.

A still further object is to provide a shell or casing for the lens securing means thus concealing the movable parts resulting in an enclosure having a more aesthetic appeal to the eye.

A still further object is the provision of a second locking means which has a positive locking operation independently but substantially simultaneously with a link locking mechanism.

Other objects and advantages will become apparent from the following description taken in conjunction with the accompanying drawing, and it will be apparent that many changes may be made in the details of construction and arrangement of parts without departing from the spirit of the invention as expressed in the accompanying claims. The exact details shown and described are preferred forms only shown by way of illustration and are not to be considered as limitations.

Referring to the drawing:

Fig. I is a front view of an ophthalmic mounting with the temples partly removed, embodying the invention.

Fig. II is a plan view of the mounting shown in Fig. I.

Fig. III is a fragmentary enlarged sectional view taken on line III—III of Fig. II showing the lens-rim snapped into its normally closed or locked position.

Fig. IV is a fragmentary enlarged sectional view somewhat similar to Fig. III, showing the closed separable split lens-rim in a retracted or unlocked position in relation to the lens.

Fig. V is an enlarged sectional view taken along line V—V of Fig. III showing the lens in relation to the lens-rim and temple support in closed position.

Fig. VI is an enlarged sectional view taken along line VI—VI of Fig. IV showing the protuberance-indenture locking mechanism in complete interengagement.

Heretofore, devices of the general type to which this invention pertains employed a split lens-rim securing means such as a screw, or in instances, a resilient means such as a spring. While certain means and methods have been in practice, none of the split rim lens securing means employed a closed lens-rim having a positive snap action for locking the lens-rim in a normally operative position to definitely secure the lens in its mounting.

In cases where the split rim is held together by a threaded member such as a screw, the threaded member would frequently have the screw driver slot roughened, burred, or generally ineffective. This was frequently due to improper manipulation of tools by workmen, and frequently caused by the metallic composition of the screw member being of a quality not conductive to rough usage.

In many instances the temple of the mounting was attached in such a way that when the lens holding screw was removed from its fully operative position, the temple would be free and would become disengaged from its mounting. This factor would make the reassembly operation more complicated and frequently extremely difficult.

In cases where a screw was used to secure the opposing ends of the split rim mounting, the securing screw was frequently located some distance from the periphery of the lens-rim. In cases of this type the tightening of the screw would frequently cause a binding action at one point around the lens and not result in an equal pressure about the lens-rim thus causing strain and stress on the lens at a certain point. The present invention entirely eliminates all of the above undesirable features.

Referring to the drawing wherein like reference characters designate similar parts throughout the several views, and referring more particularly to Fig. I an ophthalmic mounting 6 has a bridge or center bar 7 securely connected to lens-rims 8. Nose pads 9 are mounted on one end of arms 10 while the other ends of the arms are connected to the opposing ends of the bridge 7 in any conventional or convenient manner. Temples 11, shown partly broken away, are connected to temple supports 12 which supports in the present instance encase the split lens-rim securing means which holds the lenses 13 securely within the lens-rims of the ophthalmic mounting.

The view shown in Fig. II is a top or plan view of the ophthalmic mounting and more clearly shows one form of the invention which has the temple support being somewhat wider in cross section than the lens-rim 8. In this respect it is shown that the temple mounting fits substantially around the sides of the lens-rim giving added resistance to the lateral motion of the temple support due to manipulation of the lens-rim relative to the temple. The temple is secured to the temple support or endpiece by means of screws 14 as shown in the present drawing, but it is to be understood that a pin or other equivalent part may be used.

Fig. III is an enlarged sectional view taken on line III—III of Fig. II and shows the lens 13 securely clamped by the opposing ends 15 and 16 of the lens-rim 8. The upper portion 15 of the lens-rim 8 has a stud 17 securely affixed thereto by soldering, welding, or other convenient means, said stud being substantially at right angles to the outer peripheral edge of the lens-rim at the point where it is connected thereto. The lower portion 16 of the lens-rim 8 has the temple support 12 securely connected thereto in any convenient manner. In the present instance the temple support is shown as having a recess 22 therein for the purpose of housing an operable mechanism which positively connects the upper and lower portions 15 and 16 respectively of the lens-rim 8.

The temple support or endpiece 12 in the present instance is shown as a single piece of material being machined at 22 to provide a recess for the movable link 18 which it houses. It is to be understood that the temple support may be a shell or other housing means of any nature whatsoever provided it performs the function for which it was intended as disclosed in the present invention. The temple support may be made of two substantially similar pieces of material secured together by pins or soldering or may be made from a single piece of hollow metal.

While one end of the temple support 12 has been described as being securely connected to the lower portion 16 of the lens-rim 8, the opposing end of the temple support is substantially free to move relative to the upper portion 15 of the lens-rim though it is pivotally connected thereto.

A link or restricting means 18 has one end thereof pivotally connected by a pin 19 to the lug 17. The opposite end of the link 18 is pivotally connected to the temple shell or support 12 by means of a pin 20 which is secured to the shell to provide a rocking pivot for the link 18.

Since the pin 20 is stationary in relation to the temple support 12, and the pin 19 is stationary relative to the lug 17, the link therefore must be freely movable about the pins 19 and 20 to permit the temple support to be moved.

The dash dot line through the center of pin 19 represents a theoretical center line for the snap lock action of the mechanism embraced by the temple support or endpiece shell 12.

In the present instance as shown in Fig. III, the pin 20 is to the left of the dash dot line indicating that the center line has been passed and that the device is now securely locked in its operative position.

Fig. IV shows the invention in an unlocked or open position which may be referred to as the released position. The lug 17 is shown connected to the upper portion 15 of the lens-rim 8 and having a stud 19 thereon. The link 18 is shown pivotally connecting the studs or pins 19 and 20. In the view shown in Fig. IV it will be noticed that the pin 20 is far to the right of the dash dot theoretical center line indicating that the temple support is now holding the opposing ends of the split rim in released or distended position.

While the locked and unlocked positions have been referred to as having the pin 20 to the left or right respectively of the theoretical center line, it is to be understood that this is purely figurative. The locked and released positions are simply to be understood as being generally opposed to each other in regard to the movement of the locking lever or connecting link 18.

The view in Fig. V is taken along lines V—V of Fig. III and is somewhat enlarged showing the lens 13 having a V-shaped peripheral edge inserted in a V-shaped groove of the upper portion 15 of the lens-rim 8. The free end of the endpiece shell or temple support 12 is shown positively engaging the lens-rim 8. The view shown in Fig. V clearly indicates that the locked condition of the split lens-rim positively holds the lens within its respective groove in the lens-rim, which lens-rim is in turn securely engaged by the free end of the endpiece shell 12. It is pointed out that sides 21 are contiguous with and a part of the endpiece 12.

The sides 21 form a channel section which embraces both sides of the lens-rim 8 where it engages same. This positive mechanical contact restricts lateral motion of the channel-shaped endpiece relative to the lens-rim since it is pointed out the lens-rim in the present showing has an outer contour in its cross section substantially identical with the inner contour of the free end of the temple support where it engages the lens-rim. While the top is shown to be substantially at right angles with the sides of the lens-rim it is to be understood that the cross sectional outer contour may be any shape whatsoever such as round or multi-sided.

In operation, the view shown in Fig. III represents a locked position holding the lens in positive cooperation with its respective lens-rim. The view shown in Fig. IV is representative of the unlocked or released position of the split rim mounting. The inside area defined by the lens-rim support is at its greatest when the endpiece support is positioned approximately as shown in Fig. IV. The inside area defined by the lens-rim support is the smallest when the pin 20 is right on the dash dot theoretical center line. The view shown in Fig. III represents the locked condition, which has the pin 20 moved substantially to the left of the theoretical dash dot center line which clearly indicates that the inside area defined by the lens-rim is not at its minimum but somewhat greater than its minimum. By this condition the locking operation has caused the lens-rim area to be reduced to its minimum and thereafter slightly enlarged by the normal resilient action of the component parts such as the lens-rim, pivoted link, etc., tending to react to tension strain when in secured relation with the peripheral edge of the lens and taking place particularly when the pin 20 has been moved to the left of the dash dot center line as shown in Fig. III.

In actual operation, once the lens is placed within the lens-rim, the lens-rim is held substantially stationary and a relative movement of the endpiece toward the lens-rim will cause the split lens-rim to be locked securely into place due to the snap action of the pin 20 moving past the theoretical dash dot center line.

The temples are connected to the endpieces by means of a screw as shown in Figs. I and II and the temples are substantially at right angles to the endpieces or temple supports. It should be clear that the normal strain on the temple support from actual usage would have a tendency to create friction on the pins 19 and 20 thereby tending to greater increase the locking action of the temple support when in a locked condition. This feature is important since the force applied for the locking and releasing operation must take place in a plane substantially equivalent to that of the lens-rim. A force at right angles to the plane of the lens-rim is created when the ophthalmic device is in actual use thereby creating a friction on the locking means and further increasing the locking pressure when in normal usage. However slight this increased pressure may be, it is pointed out that its normal tendency is to increase the resistance of the snap lock action above and beyond the releasing resistance when the ophthalmic device is in use.

Although a force at right angles to the plane of the lens-rim may be created when the ophthalmic device is in actual use this force will be limited by the embracing function of the side walls 21 of the temple support 12 to the extent that the link member 18 and its pivot means will not become distorted and inoperative from continued use.

The fragmentary sectionalized view shown in Fig. VI is taken substantially along lines VI—VI of Fig. IV and is somewhat similar to the construction as represented by Fig. V. Figs. IV and VI may be jointly considered, relative to the second locking means. The channel side walls 21 of the temple support 12 are shown as having an elongated protuberance 23 thereon which protuberance engages a complemental female member or indenture 24 to provide a positive locking means for the temple support in relation to the lens-rim.

While an elongated protuberance is shown as being a depressed portion in the side walls 21 it is to be understood that the protuberance may be a simple depressed portion which may be caused by a pointed tool, such as a punch mark or a plurality of punch marks in any desirable pattern. The indenture in any case would naturally be adaptable to suitably receive the complemental male protuberance regardless of the extent or contour of said protuberance.

This protuberance-indenture locking means is utilized to provide a second locking means for the temple support where it engages the lens-rim frame, and to also act as a positive contact means between the side walls 21 and the indenture 24 so that any possible slight deformation in the side wall will not prevent the rim from being positively gripped by the side walls which is of primary importance to restrain lateral motion of the temple support on the lens-rim. In the present showing the second or channel locking means would reach its maximum closed position substantially simultaneously with the maximum closed position of the link snap action locking means.

The protuberance-indenture locking means has been described as being a positive locking mechanism in addition to the link snap locking mechanism. This is true in any case but it has been found that instead of having the protuberance-indenture locking mechanism fully engaged, it is desirable at times to advantageously use the inclined plane feature wherein the male and female members are not completely coupled so that the inclined wall of the male member does not extend to the apex of the female member but rather, rests ultimately just short of complete interengagement. This ultimate interengagement will take place after the snap lock action is completed so that the inclined surfaces of the protuberance-indenture locking mechanism, when in complete interengagement will have a tendency to further urge the temple support toward the lens-rim periphery due to the inward spring action of the side walls 21 when the protuberances engage the indentures.

The complete interengagement and the incomplete interengagement of the second locking means each have special functions which may be desirable in different types of ophthalmic mountings. The former may preferably be used on the average ophthalmic mounting but the latter or incomplete interengaging type of locking means may find a special use on the heavier type ophthalmic mounting such as worn by vehicle drivers or aviators where the aesthetic appearance is secondary to durability. In the latter case a deeper indenture may be used with a complemental protuberance which would permit the protuberance-indenture combination to be the more dependable for the particular objective desired, namely the sacrifice of appearance for advantageous stability. Summarily, the channel locking means and the link locking means would operate substantially simultaneously to effect an ultimate dual locking of the temple support on the lens-rim.

From the foregoing description it will be seen that the split lens-rim may be easily enlarged since the split ends are separable yet positively connected at all times. The snap lock action at all times positively secures the opposing split ends of the lens-rim and normal usage of the ophthalmic mounting as described will cause the locking resistance to be greater than when the device is not in use. The invention provides simple, efficient, and economical means of accomplishing all of the objects and advantages set out hereinbefore.

It will also be seen from the specification that the link means has an enclosure which is, in fact, a temple support. The temple support or endpiece is securely connected to one of the sides of the split and extends across the split to firmly engage the opposing side of the split in a manner to provide a substantially dust-proof housing for the link means. While the channel portion of the temple support housing is shown in Fig. V as extending on the sides only of the lens-rim, it is to be understood that the drawing is only by way of illustration, and the sides in whole or in part may be crimped or formed in any suitable manner to substantially enclose the lens-rim split, and may engage the lens so that the underneath portion of the channel will add to the desired dust-proof qualities of the split lens-rim connection.

In commercial manufacture, means employed may involve changes from the specific disclosure set forth herein and minor changes may readily suggest themselves. The right to make certain minor departures from the specification and drawings is retained and equivalent parts may be used within the spirit of the invention as defined by the subjoined claims.

Having described my invention, I claim:

1. An ophthalmic mounting comprising a pair of lens rims each having divided ends, a temple support secured adjacent one of said divided ends of each rim having temple connection means thereon and having a hollowed portion extending outwardly beyond said end to overlie the other of said divided ends, a link member pivotally connected adjacent one of its ends internally of the hollowed portion and pivotally connected adjacent its opposed end to the other divided end of the rim with the pivots so arranged that when the temple support is moved to a position to overlie said other divided end of the rim member and to lie in adjacent relation therewith the center of the pivot connecting the link to said hollowed portion will move inwardly of a line passing through the pivot connecting said link with said other divided end portion of the rim and substantially parallel with a line tangent to said other divided portion of the rim adjacent the free end thereof and thereby cause the divided ends of the rims to be drawn and held in adjacent relation with each other and movement of the temple support in the opposite direction will cause the said divided ends to move from adjacent relation with each other.

2. An ophthalmic mounting comprising a pair of lens rims each having divided ends, a temple support secured adjacent one of said divided ends of each rim having temple connection means thereon and having a hollowed portion extending outwardly beyond said end to overlie the other of said divided ends with said hollowed portion having spaced walls adapted to embrace said other divided end portion, a link member pivotally connected adjacent one of its ends internally of the hollowed portion and pivotally connected adjacent its opposed end to the other divided end of the rim with the pivots so arranged that when the temple support is moved to a position to overlie said other end of the rim member and with the spaced walls in embracing relation with said other divided end of the rim member the center of the pivot connecting the link to said hollowed portion will move inwardly of a line passing through the pivot connecting said link with said other divided end portion and substantially parallel with a line tangent to said other divided end portion of the rim adjacent the free end thereof and thereby cause the divided ends of the rim to be drawn and held in adjacent relation with each other and movement of the temple support in the opposite direction will cause the said divided ends to move from adjacent relation with each other.

3. An ophthalmic mounting comprising a pair of lens rims each having divided ends, a temple support secured adjacent one of said divided ends of each rim having temple connection means thereon and having a hollowed portion extending outwardly beyond said end to overlie the other of said divided ends with said hollowed portion having spaced walls adapted to embrace said other divided end portion, a link member pivotally connected adjacent one of its ends internally of the hollowed portion and pivotally connected adjacent its opposed end to the other divided end of the rim with the pivots so arranged that when the temple support is moved to a position to overlie said other end of the rim member and with the spaced walls in embracing relation with said divided end of the rim member the center of the pivot connecting the link to said hollowed portion will move inwardly of a line passing through the pivot connecting said link with said other divided end portion and substantially parallel with a line tangent to said other divided end portion of the rim adjacent the free end thereof and thereby cause the divided ends of the rim to be drawn and held in adjacent relation with each other and movement of the temple support in the opposite direction will cause the said divided ends to move from adjacent relation with each other, the contiguous surfaces of said spaced walls and the sides of said other divided end portion having protuberance-indenture means constituting a second locking mechanism to provide additional securing means between the temple support and the lens rim.

4. Connecting means for joining the meeting ends of the divided portions of the lens rims of an ophthalmic mounting comprising a hollowed member secured to one of said divided portions of each rim and extending outwardly beyond the end thereof to overlie the other of said divided portions, a link member pivotally connected adjacent one of its ends internally of the hollowed portion and pivotally connected adjacent its opposed end to the other of said divided portions of the rim with the pivots so arranged that when the hollowed member is moved to a position to overlie said other divided portion of the rim and to lie in adjacent relation therewith the center of the pivot connecting the link to said hollowed member will move inwardly of a line passing through the pivot connecting said link with said other divided portion of the rim and substantially paralell with a line tangent to said other divided portion of the rim adjacent the free end thereof and thereby cause the ends of the rim to be drawn and held in adjacent relation with each other and movement of said hollowed member in the opposite direction will cause the said ends to move from adjacent relation with each other.

5. Connecting means for joining the meeting ends of the divided portions of the lens rims of an ophthalmic mounting comprising a hollowed member secured to one of said divided portions of each rim and extending outwardly beyond the end thereof to overlie the other of said divided portions, said hollowed member having spaced walls adapted to embrace said other divided portion, a link member pivotally connected adjacent one of its ends internally of the hollowed member and pivotally connected adjacent its opposed end to the other of said divided portions of the rim with the pivots so arranged that when the hollowed member is moved to a position to cause the spaced walls to embrace the side walls of the other divided portion of the rim the center of the pivot connecting the link to said hollowed member will move inwardly of a line passing through the pivot connecting said link with said other divided portion of the rim and substantially parallel to a line tangent to said other divided portion of the rim adjacent the end thereof and thereby cause the ends of said divided portions to be drawn and held in adjacent relation with each other and movement of the hollowed member in the opposite direction will cause the ends of said divided portions to move from adjacent relation with each other.

6. Connecting means for joining the meeting ends of the divided portions of the lens rims of an ophthalmic mounting comprising a hollowed member secured to one of said divided portions of each rim and extending outwardly beyond the end thereof to overlie the other of said divided portions, said hollowed member having spaced walls adapted to embrace said other divided portion, a link member pivotally connected adjacent one of its ends internally of the hollowed member and pivotally connected adjacent its opposed end to the other of said divided portions of the rim with the pivots so arranged that when the hollowed member is moved to a position to cause the spaced walls to embrace the side walls of the other divided portion of the rim the center of the pivot connecting the link to said hollowed member will move inwardly of a line passing through the pivot connecting said link with said divided portion of the rim and substantially parallel to a line tangent to said other divided portion of the rim adjacent the end thereof and thereby cause the ends of said divided portions to be drawn and held in adjacent relation with each other and movement of the hollowed member in the opposite direction will cause the ends of said divided portions to move from adjacent relation with each other, the said spaced walls of the hollowed member and the side walls of the divided portion of the rim embraced thereby being provided with protuberance-indenture means interfitting with each other when in said relation and constituting a second locking mechanism to provide an additional securing means between the hollowed member and said divided portion of the lens rim.

7. An ophthalmic mounting comprising a pair of lenses having beveled edges of controlled contour shape, a pair of lens rims shaped substantially to and channeled to receive the contour edges of the lenses and each having divided end portions, a hollowed member secured adjacent one of said divided end portions of each rim and extending outwardly beyond the end thereof to overlie the other of said divided end portions, a link member pivotally connected adjacent one of its ends internally of the hollowed member and pivotally connected adjacent its opposed end to the other divided end portion of the rim with the pivots so arranged that when the hollowed member is moved to a position to overlie said other divided end portion and to lie in adjacent relation therewith, the center of the pivot connecting the link to said hollowed member will move inwardly of a line passing through the pivot connecting said link to said other divided portion of the rim and substantially parallel with a line tangent to said other divided end portion of the rim adjacent the free end thereof and thereby causing the divided ends of the rims to be drawn and held in adjacent relation with each other, and movement of the hollowed member in the opposite direction will cause the said divided ends to move from adjacent relation with each other.

STUART F. CASAVANT.